United States Patent
Hosoi et al.

(10) Patent No.: US 7,311,262 B2
(45) Date of Patent: Dec. 25, 2007

(54) METHOD OF DECODING A SYMBOL WITH A LOW CONTRAST

(75) Inventors: Kazukuni Hosoi, Saitama (JP); Haruo Matsuoka, Saitama (JP)

(73) Assignee: Optoelectronics Co., Ltd., Warabi, Saitama Pref. (JP)

( * ) Notice: Subject to any disclaimer, the term of this patent is extended or adjusted under 35 U.S.C. 154(b) by 0 days.

(21) Appl. No.: 10/914,347

(22) Filed: Aug. 9, 2004

(65) Prior Publication Data

US 2006/0027661 A1    Feb. 9, 2006

(51) Int. Cl.
G02B 26/10    (2006.01)
(52) U.S. Cl. ................................. 235/462.25
(58) Field of Classification Search ............ 235/462.25
See application file for complete search history.

(56) References Cited

U.S. PATENT DOCUMENTS

| | | | | |
|---|---|---|---|---|
| 5,412,197 A | * | 5/1995 | Smith ....................... | 235/462.1 |
| 5,545,887 A | * | 8/1996 | Smith et al. ............ | 235/462.08 |
| 5,708,261 A | * | 1/1998 | Chen ...................... | 235/462.18 |
| 6,173,893 B1 | * | 1/2001 | Maltsev et al. ......... | 235/462.09 |
| 6,685,093 B2 | * | 2/2004 | Challa et al. ........... | 235/462.46 |

FOREIGN PATENT DOCUMENTS

| | | |
|---|---|---|
| JP | 60-65383 A | 4/1985 |
| JP | 3-25585 A | 2/1991 |
| JP | 11-316794 A | 11/1999 |
| JP | 2003-30577 A | 1/2003 |
| JP | 2003-337941 A | 11/2003 |

OTHER PUBLICATIONS

Int'l Search Report & Written Opinion Dec. 27, 2005.

* cited by examiner

*Primary Examiner*—Michael G. Lee
*Assistant Examiner*—Tae W. Kim
(74) *Attorney, Agent, or Firm*—Kaplan Gilman Gibson & Dernier LLP

(57) ABSTRACT

A method for encoding a symbol such as a barcode with a finder of a known pattern, comprises steps of determining a potential point on the finder edge and tracing and verifying a path representing the finder edge by checking the color of each point on the path against a threshold. The threshold is preferably reevaluated at least every several pixel movements along the path. The method may decode the barcode directly from the gray image displayed on a LCD screen without a need of a whole characterized image.

27 Claims, 6 Drawing Sheets

METHOD OF DECODING A SYMBOL WITH A LOW CONTRAST

TECHNICAL FIELD

The present invention relates to symbol decoding techniques, and more particularly, to a method of decoding a symbol with a low contrast against its background, such as a barcode displayed on an LCD screen when the backlight of the screen is turned off.

BACKGROUND OF THE INVENTION

Barcodes are universally used in many applications, such as a machine-readable symbols containing desired information. For example, a barcode can be used on a package to provide all kinds of information from the manufacturer regarding the product, or can be used as a digital movie ticket displayed on a mobile phone LCD screen. To contain more information in a small area such as a mobile phone display, a two-dimensional barcode, such as a Data Matrix barcode, is advantageous. Information encoded in a barcode is usually represented by black and white data modules such as bars, squares, etc, and arranged with finders of a specific pattern. The finders need to be located when the barcode is decoded.

FIGS. 1 and 2 illustrate a Data Matrix barcode displayed on a mobile phone LCD screen and its characterized images. As is well-known in the art, a Data Matrix barcode (see FIG. 3) is a two-dimensional matrix symbology containing dark and light square data modules. It has a finder pattern of two intersecting solid edges 1, 2 and two intersecting alternating dark and light edges 3, 4 on the perimeter of the symbol. To decode a barcode displayed on as an image on an LCD screen (FIG. 1a), a binarized image (FIG. 1b) is generated from the original gray image (FIG. 1a) by means of algorithms, which can be eventually be packaged in FPGA or ASIC. The term binarize refers herein to the process by which a symbol is read and then portions of it are classified into one of two types, usually but not necessarily dark or light.

As shown in FIGS. 1a and 1b, when the gray image has a high contrast compared to its background, the image is clear enough that the barcode may easily be binarized. However, when the contrast is low, such as shown in FIG. 2a when the backlight of the LCD screen is turned off, the image may be so unclear (as shown in FIG. 2b) that it is difficult or impossible to correctly decode the symbol if one tries to simply binarize it as in FIG. 1.

Another problem of prior systems is that when scanning an image to be decoded, there is usually a fixed threshold above which an area is deemed "light", and below which an area is deemed "dark". In other words, the decision as to whether the part of the symbol being scanned is dark or light is a simple matter of comparing reflected light level with a fixed threshold. When contrast is low however, the appropriate threshold may be only applicable locally, to a particular area of the symbol being read. Hence, the use of a particular optimized fixed threshold in one area of the symbols being scanned does not necessarily mean that the same fixed threshold for distinguishing dark from light will be applicable in another area.

An object of the present invention is therefore to provide a method for finding a barcode or symbol in a dark background in the gray image, e.g., displayed on a dark LCD screen without binarizing the whole image first.

SUMMARY OF THE INVENTION

The above objects are realized in accordance with the novel method of the present invention for finding an edge of a finder of the symbol. In particular, the method comprises the steps of: picking up data on a line possibly crossing an edge of a potential finder of said symbol, and calculating a runlength on the line; determining a potential point of said edge on said line where a light level change occurs in said calculated runlength; determining a path extending from said potential point representing said edge according to said known pattern of said finder; and verifying whether said path is actually said edge. Thus, the finder can be located without binarizing the whole image. The entire process of locating the finder can be accomplished in grey scale, before the image is binarized.

Preferably, the path is verified by checking whether each point on said path is of a light level expected from the finder pattern by comparing the data at each point with a threshold. More specifically, the presence and location of a vertical line forming part of the finder pattern may be verified by repeatedly searching for a change in grey scale level along plural horizontal lines, each spaced apart vertically from each other. The presence and location of a horizontal line forming part of the finder pattern may be verified by repeatedly searching for a change in grey scale level along plural vertical lines, each spaced apart horizontally from each other.

Preferably, the threshold is calculated at a point on the path and applied to next points along said path. Preferably, the threshold is reevaluated every several points along the path so as to adjust the threshold when the contrast is not consistent on the image.

In other embodiments, the light level may be one or more light levels of different colors, permitting the methodology to be useful in reading color symbols.

BRIEF EXPLANATION OF THE DRAWINGS

The above and other features and advantages of the present invention will be clearer from reading the detailed description of the preferred embodiments with reference to the accompanying drawings, in which:

FIG. 1a illustrates a gray image of a Data Matrix barcode on a mobile phone LCD screen when the backlight of the screen is on;

FIG. 1b illustrates a binaraized B&W characterized image from the gray image in FIG. 1a;

FIG. 2b a binarized B&W characterized image from the gray image in FIG. 2a;

DETAILED DESCRIPTION OF THE PREFERRED EMBODIMENTS

To explain the method of the present invention, a Data Matrix barcode is taken as an example in the preferred embodiment. It shall be understood, however, that the present invention is not limited to a specific type of barcode, but can generally be applied to all the symbols, and is preferably used in a system wherein there is a known finder patter.

Figure 2A:
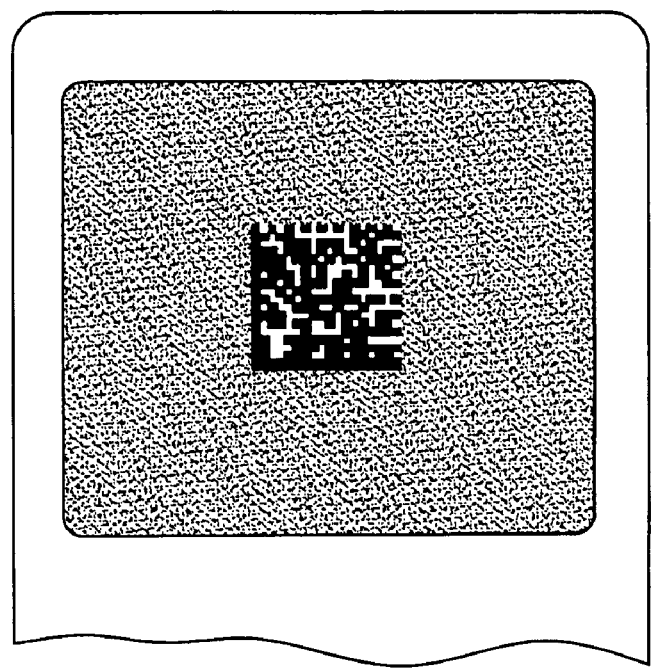
FIG. 2a illustrates a gray image similar to FIG. 1a but the backlight of the LCD screen is off.
Figure 2B:
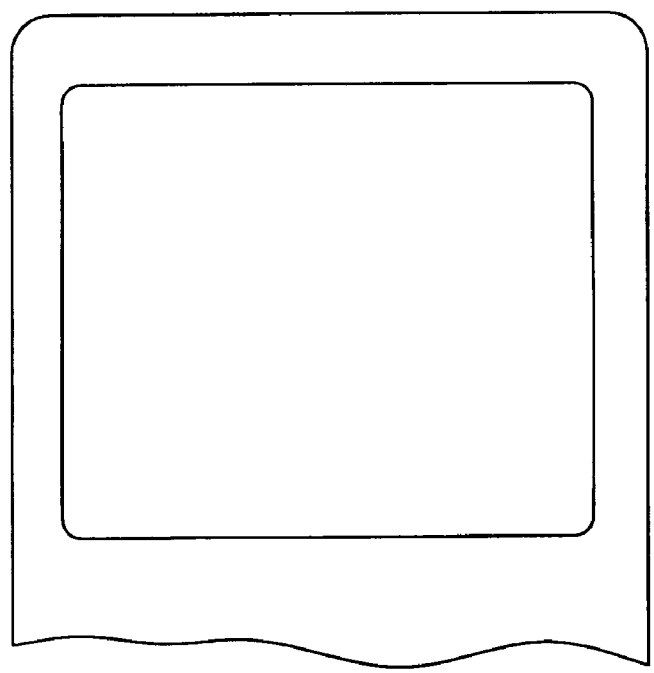
Figure 3:
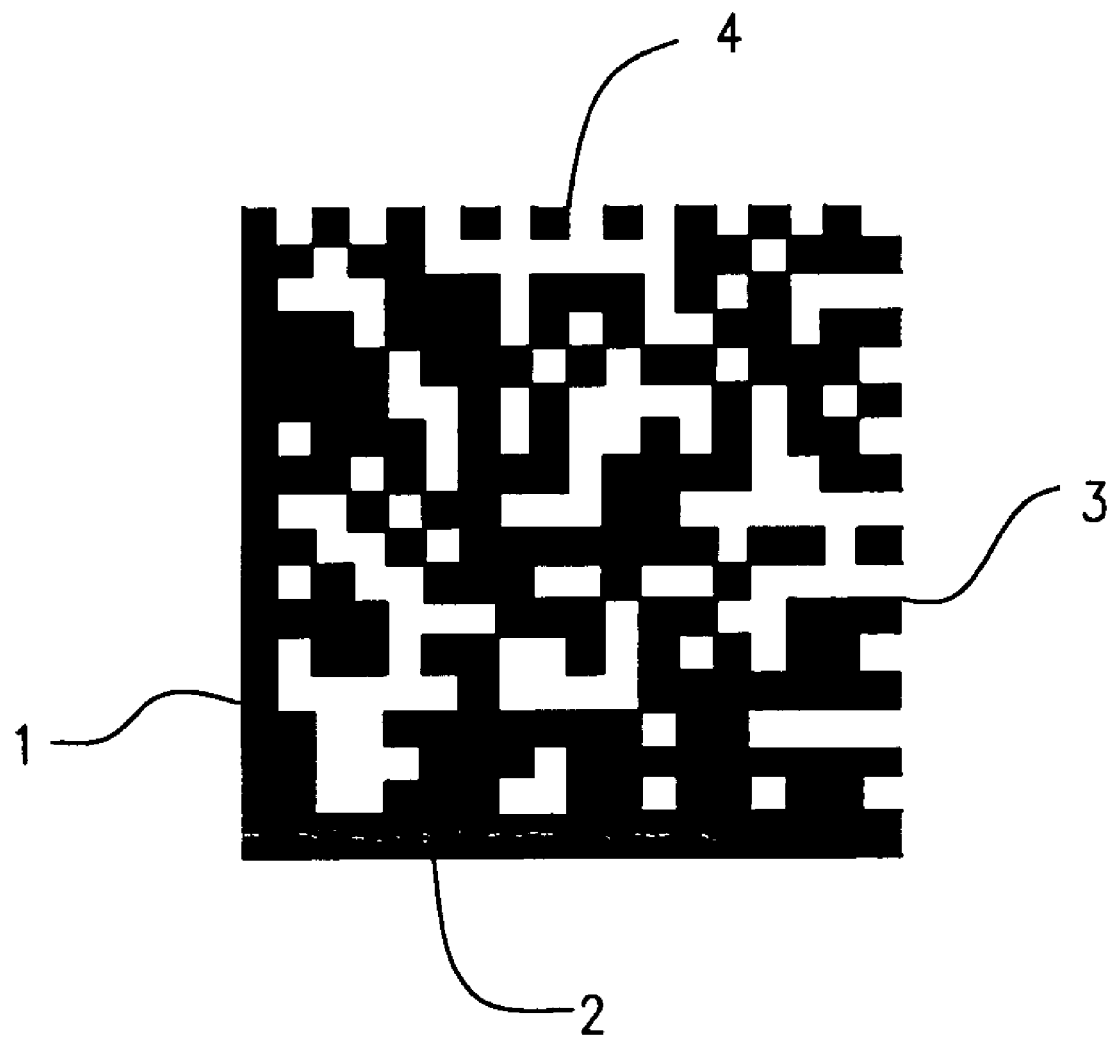
FIG. 3 illustrates a typical Data Matrix barcode.
Figure 4A:
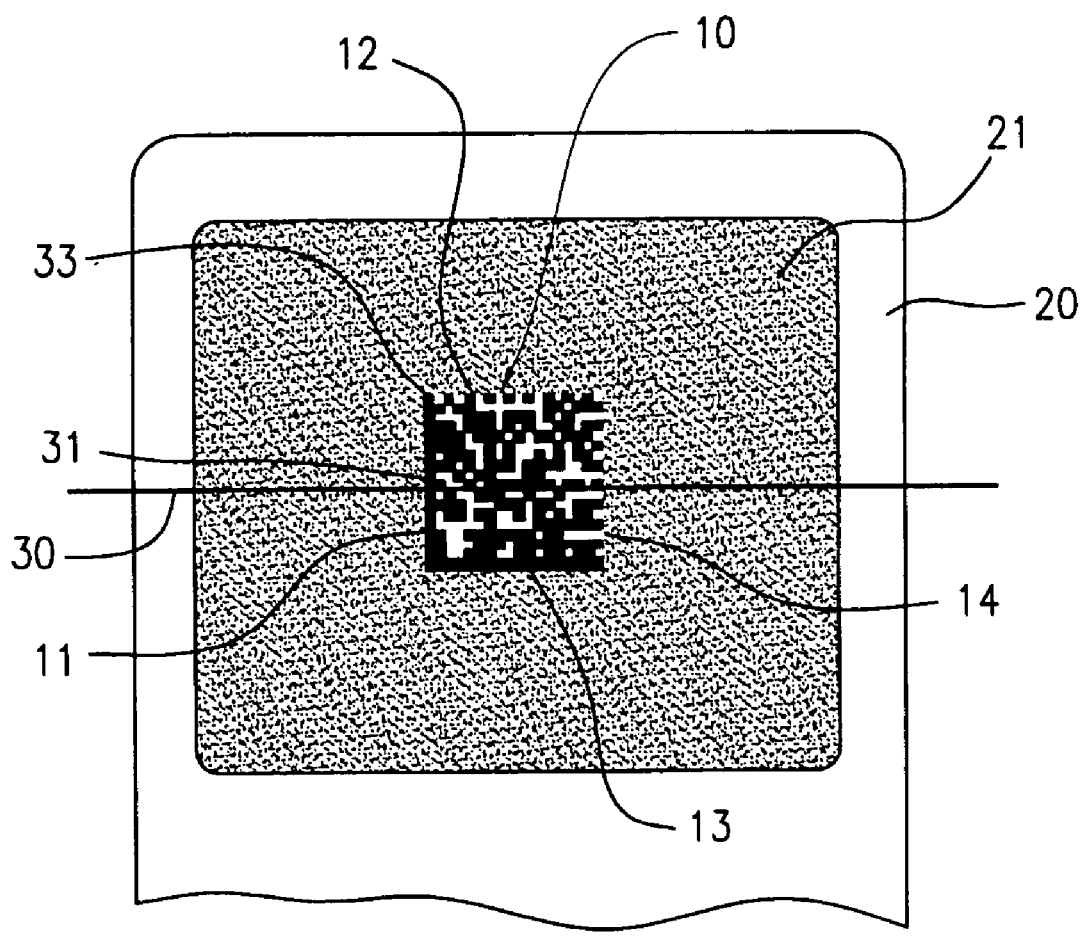
FIGS. 4a-4d illustrates the method of the present invention.

Reference is now made to FIG. 4a, which illustrates a gray image of a Data Matrix barcode 10 displayed on an LCD screen 21 of a mobile phone 20. Like in FIG. 2a, the backlight of the LCD screen 21 is turned off, thus the contrast of the barcode 10 compared to the display background is very low and therefore the characterized whole image will be very unclear like FIG. 2b.

Figure 1A:
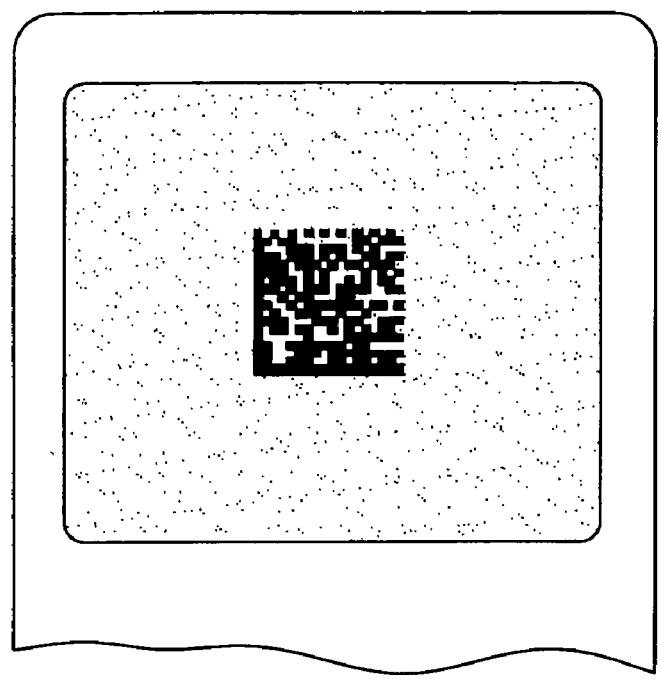
Figure 1B:
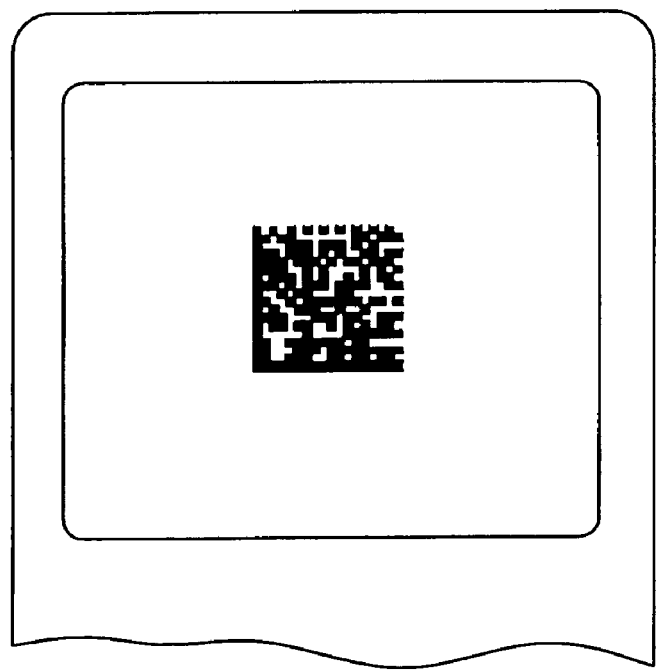

According to the present invention, the system locates the finder pattern without first binarizing the symbol into dark and light portions, as shown in FIG. 1b. Instead, the present invention finds the edges of the finder in the symbol, and thus, the finder pattern may be located directly from the original gray image as shown in FIG. 4a. Gray scale levels are used prior to locate the finder without binarization.

As explained above, the Data Matrix has two solid edges 11, 12 forming and two teethed edges 13, 14 with alternating dark and light square modules. The two solid edges 11, 12 form an L-shaped finder. Now we take the vertical solid edge 11 as an example to explain how to find edges according to the teachings of the present invention.

Figure 4B:
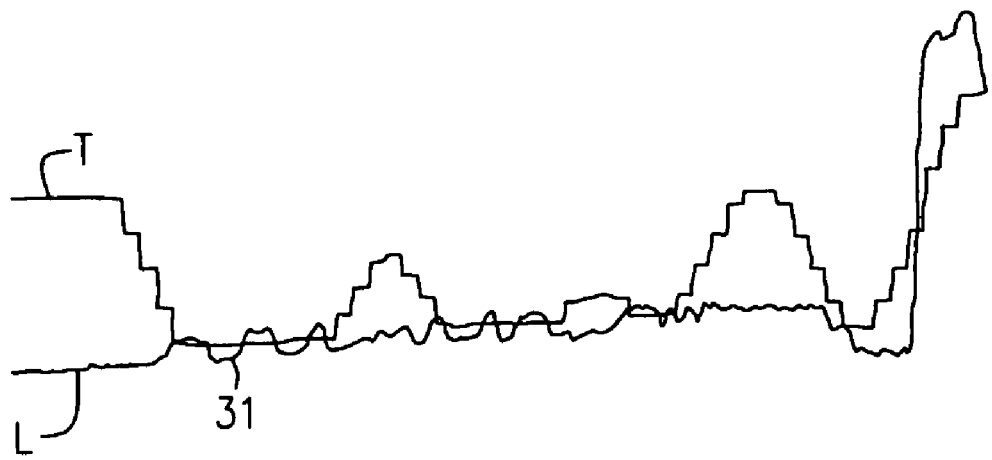

To locate the solid edge 11, a horizontal straight line 30 is predetermined which possibly crosses the edge 11. Gray data along the line 30 is picked up. The runlength (line R in FIG. 4c) on the line 30 is calculated from the gray level (line L in FIG. 4b) the threshold (line T in FIG. 4b) on the horizontal line 30. It is noted that there are a plurality of methods by which the detection can occur, such as detecting changes in level of light, in rate of change in dark/light levels, or any of a variety of other methods. The particular method used to determine when the symbol is "high" or "low" is not critical to the present invention.

Figure 4C:
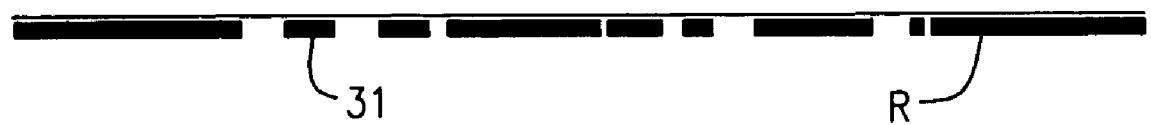

As can be seen in the runlength shown in FIG. 4c, the color change between dark and light occurs along the line 30. The light color is generally the same as the background color of the display. Because the finder edge 11 is a solid edge of the L-pattern shaped pattern of the finder, the point 31 where a first color change from light to dark (or from white to black) occurs is determined as a potential point on the finder edge 11.

Since the edge 11 of the L-shape finder extends vertically or substantially perpendicular to the horizontal straight line 30, a path 32a, 32b which runs vertically in both directions from the point 31 is determined (shown as the arrows in FIG. 4d) to potentially represent the edge 11.

To verify whether said path 32a, 32b is actually the finder edge 11, the color at each of the points (square modules) along the path 32a, 32b is checked against the threshold whether it is black (or dark). If every point along the path 32a, 32b turns out to have the dark color, the path 32a, 32b can be verified as the edge 11.

It is possible, however, that the contrast is not consistent in the gray image. Therefore, the threshold is preferably reevaluated at least every several pixel movements while tracing along the path 32a, 32b. For example, the threshold calculated at point 31 (i.e., along the line 30) can be used to determine the color of the next five points along the path 32a, then the threshold is recalculated at the last one of these five points. This recalculated threshold will be applied to the next five points to determine their colors.

To maximize the accuracy in determining the color or light level of the points on the path 32a, 32b, the threshold may be recalculated at every point (i.e., every pixel or every few pixels movement along the path). That is, only a local threshold should be used for ascertaining where the line in the finder pattern is located along a specified scan line.

Figure 4D:
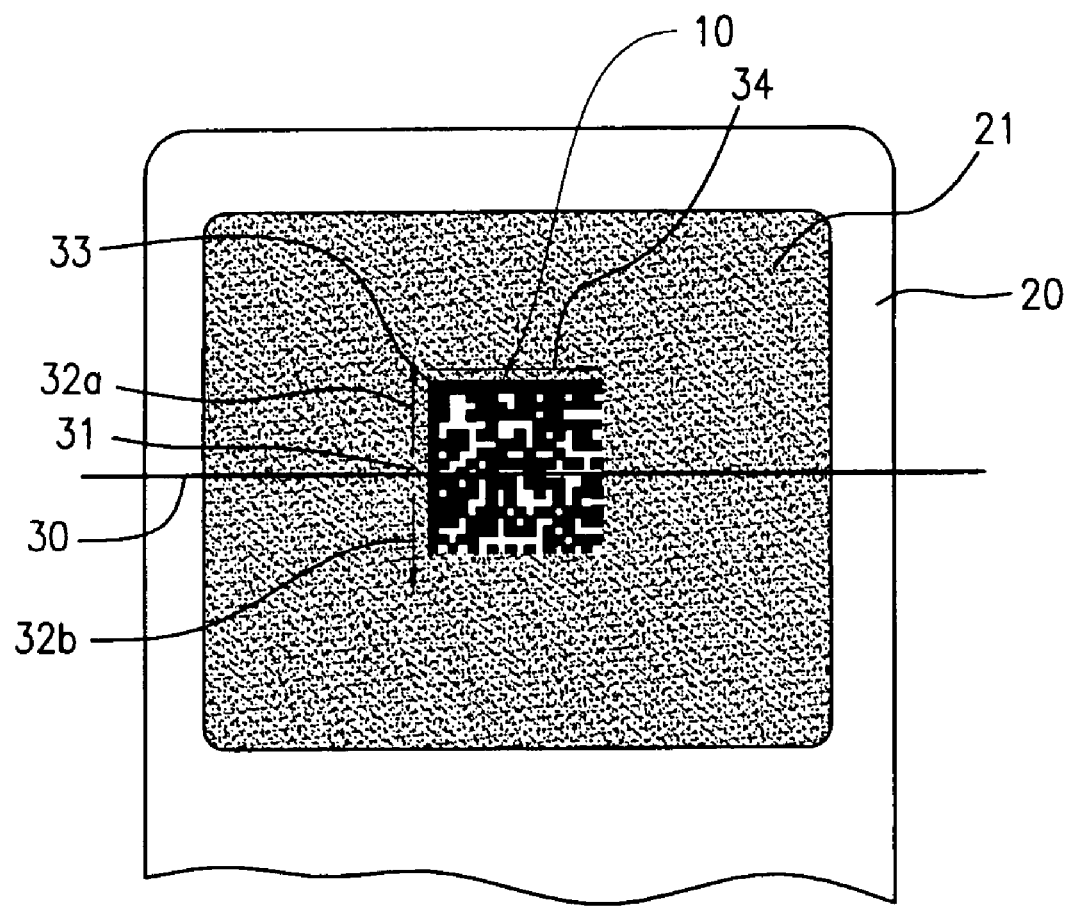

As shown in FIG. 4d, another solid finder edge 12 can be determined similarly. The path 34 to determine the edge 12, however, can start from the corner point 33 which is an end point of the verified edge 11.

If the L-shaped edges 11, 12 are determined, the L-shaped finder of the Data Matrix barcode 10 in the gray image on the screen 21 is successfully found. Then a defined Data-Matrix area is binarized and decoding process of the barcode 10 can be tried with the found L-shaped finder by means of well-known algorithms in the art. Preferably, since the location of the finder pattern means that the symbol location, size and shape may be known, the system can, after location of the finder pattern, simply lift the symbol from the gray background and binarize and decode the symbol independently.

Figure 5:
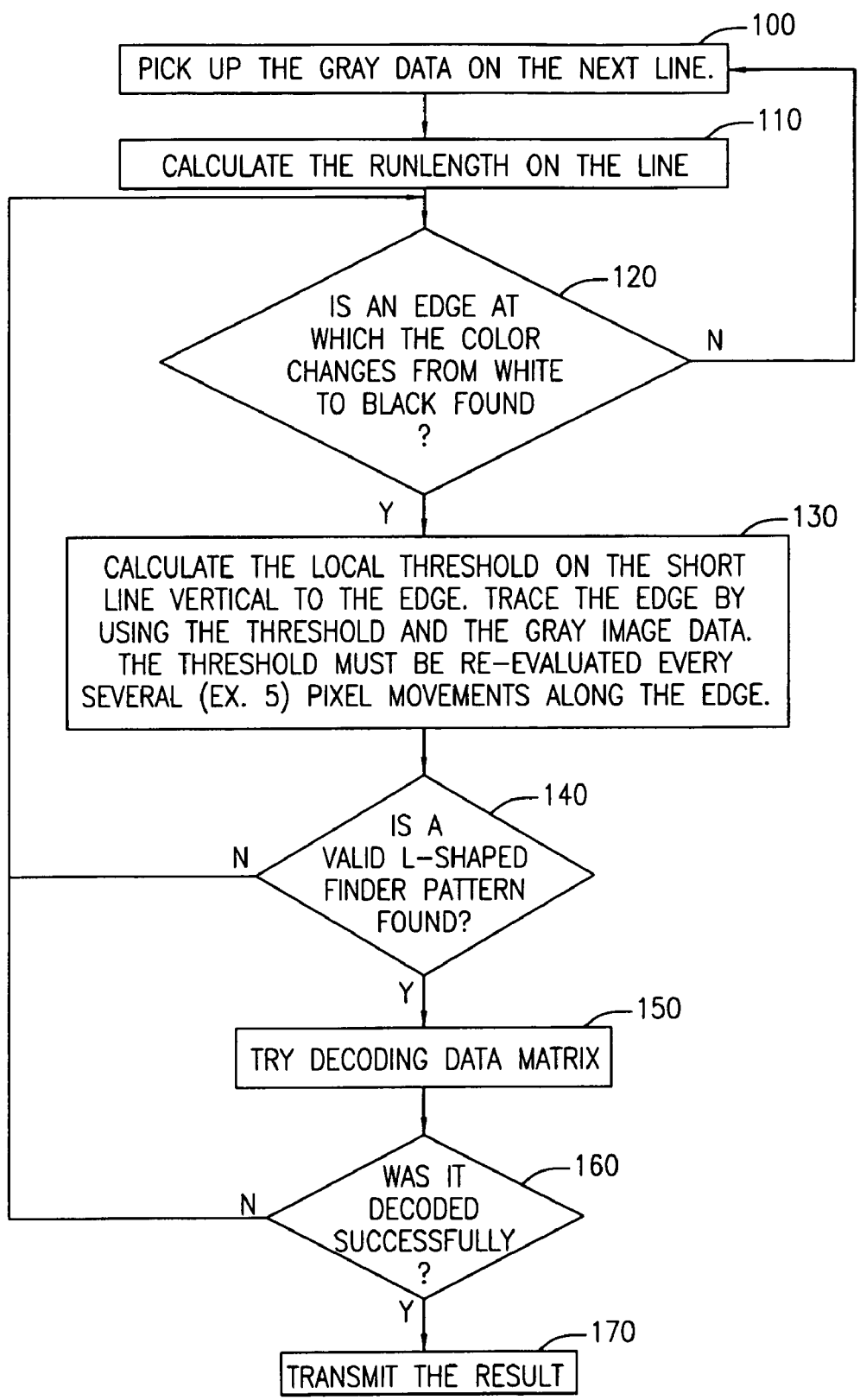
FIG. 5 illustrates a flow chat of the steps of the method of the present invention.

FIG. 5 illustrates a flow chart of the decoding process for the Data Matrix barcode according to the present invention. At step 100, the gray data on a line is picked up, and the runlength on the line is calculated at step 110. If no significant light level change is found in the runlength (which may happen if the line does not run through the barcode), step 100 will be repeated at a next line until a significant light level change on the line is found.

At step 130, the path which may be the finder edge is verified. More specifically, a threshold is calculated and the level on the path is checked by comparing the threshold and the gray image data. Preferably, the threshold is recalculated every several pixel movements along the path.

At step 140, if no valid edge L-shaped finder pattern is found by verifying step 130, the step 120 will be repeated at another point on the line where a light level change occurs until the L-shaped finder pattern is found.

After the L-shaped finder pattern is found, the binarization of the code is performed and decoding of the Data Matrix barcode is tried at step 150. If the decoding is successful, the result is transmitted at step 170, otherwise it may indicate that the found L-shaped finder pattern was actually wrong and the process will return to step 120 again to start searching for the L-shaped finder from a next potential point on the line.

Even though the above has explained in detail on how to find a finder in a Data Matrix barcode from a gray image displayed on a LCD screen of a mobile phone, it shall be understood that the present invention is not limited to the above exemplary embodiment. In particular, the present invention is not limited to decoding a Data Matrix barcode, but can be applied in any symbols that have known finder patterns, such as QR code, PDF417 code, MaxiCode, Aztec Code, RSS code, Postal Code, OCRs, etc. The path 11 may not be a straight line as in FIG. 4a, but may be a curved line when the finder edges are curves (e.g., in a MaxiCode).

Moreover, the method of the present invention can be applied in any symbol background, but not necessarily limited to LCD displays with low contracts. An advantage with the present invention is that characterization of the whole image can be omitted until the preprocessing step of finding and identifying the symbol to be decoded is accomplished. Thus, significant processing power may be saved.

Therefore, it shall be understood that numerous variations, adaptations and modifications are available to a person with ordinary skilled in the art without departing from the gist of the invention. The scope of the invention is solely intended to be defined in the accompany claims.

What is claimed is:

1. A method for finding an edge of a finder of a symbol in an image, said symbol being represented by points of either a dark color or a light color and having one or more of said finders of a known pattern, said method comprising steps of:
   a) picking up data on a line possibly crossing an edge of a potential finder of said symbol, and calculating a runlength on the line;
   b) determining a potential point of said edge on said line where a color change occurs in said calculated runlength;
   c) determining a path extending from said potential point representing said edge according to said known pattern of said finder; and
   d) verifying whether said path is actually said edge said verifying comprising checking whether each point on said path is of the dark or white color by recalculating a threshold at least every predetermined amount of said point(s) and comparing each subsequent point to said recalculable threshold.

2. The method of claim 1, wherein said step d) comprising calculating said threshold at a point on said path and applying said threshold for next points along said path.

3. The method of claim 2, wherein said threshold is reevaluated every several points.

4. The method of claim 1, wherein step a) is repeated at a next line if no said potential point can be determined at step b).

5. The method of claim 1, wherein step b) is repeated at a next potential point on said line if said path is verified as not said edge at step d).

6. The method of claim 1, wherein said image is an original gray image.

7. The method of claim 6, wherein said image is displayed on a LCD screen of a device.

8. The method of claim 7, wherein said device is a mobile phone.

9. The method of claim 1, wherein said symbol is a barcode.

10. The method of claim 9, wherein said barcode is a two-dimensional barcode.

11. The method of claim 10, wherein said barcode is a Data Matrix bar code.

12. The method of claim 11, wherein said edge is one of two solid perimeter edges of the symbol.

13. The method of claim 11, wherein said edge is one of two alternative-colored perimeter edges of the symbol.

14. The method of claim 1, wherein said dark color is a black color and said light color is a white color.

15. The method of claim 14, wherein said light color is similar to background color of said image.

16. The method of claim 1, wherein said color change in said step b) is a change from a color similar to a background color of said image to a color in contrast to said background.

17. The method of claim 1, wherein said step d) comprising checking whether a color change expected from the known finder pattern occurs at each point on said path.

18. A method for decoding a symbol having one or more finders of a known-pattern, said symbol being represented by points of either a dark color or a light color, said method comprising the steps of:
   a) picking up data on a line possibly crossing an edge of a potential finder of said symbol, and calculating a runlength on the line;
   b) determining a potential point of said edge on said line where a color changes in said calculated runlength;
   c) determining a path extending from said potential point representing said edge according to said known pattern of said finder;
   d) verifying whether said path is actually said edge, comprises checking, by recalculating a threshold at least every predetermined amount of said point(s) and comparing each subsequent point with said recalculable threshold, whether each of the points on said path has an expected color determined from the pattern of the finder;
   e) repeating said steps a)-d) to find all of said finders on said symbol; and
   f) binarizing and decoding said symbol with said found finders only if said finders are found.

19. The method of claim 18, wherein said verifying step d) comprising calculating said threshold at a point on said path and applying said threshold for next points along said path.

20. The method of claim 19, wherein said threshold is calculated at least every several points.

21. The method of claim 20, wherein said symbol is a barcode displayed on a LCD screen.

22. The method of claim 21, wherein said steps a)-f) are carried out directly from gray data obtained from the barcode.

23. The method of claim 22, wherein said barcode is a Data Matrix barcode.

24. A method for decoding a barcode having a finder of a known pattern, comprising steps of
   along a predetermined path tracing and verifying a potential edge of said finder by recalculating a threshold at least every predetermined amount of said point(s), checking a color of each subsequent point on said potential edge against said recalculable threshold, and binarizing and filtering said barcode only after said finder pattern is found.

25. The method of claim 24, wherein said threshold is calculated at a point and applied to next points along said potential edge.

26. The method of claim 25, wherein said threshold is recalculated at least every several points.

27. The method of claim 26, wherein said threshold is recalculated at each point and applied to a next point.

* * * * *